(12) United States Patent
Chou

(10) Patent No.: US 12,369,062 B2
(45) Date of Patent: Jul. 22, 2025

(54) NETWORK SLICE SUBNET INSTANCE RESOURCE OPTIMIZATION FOR 5G SYSTEMS

(71) Applicant: Intel Corporation, Santa Clara, CA (US)

(72) Inventor: Joey Chou, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 193 days.

(21) Appl. No.: 17/956,902

(22) Filed: Sep. 30, 2022

(65) Prior Publication Data

US 2023/0129575 A1 Apr. 27, 2023

Related U.S. Application Data

(60) Provisional application No. 63/251,491, filed on Oct. 1, 2021.

(51) Int. Cl.
*H04W 24/10* (2009.01)
*H04W 48/18* (2009.01)
*H04W 76/20* (2018.01)

(52) U.S. Cl.
CPC .......... *H04W 24/10* (2013.01); *H04W 48/18* (2013.01); *H04W 76/20* (2018.02)

(58) Field of Classification Search
CPC ..... H04W 24/10; H04W 48/18; H04W 76/20; H04W 88/085; H04W 88/12; H04W 24/02
See application file for complete search history.

(56) References Cited

U.S. PATENT DOCUMENTS

| | | | |
|---|---|---|---|
| 11,451,984 B2 * | 9/2022 | Tsai | H04L 41/0896 |
| 11,805,075 B2 * | 10/2023 | Senarath | H04L 41/0806 |
| 11,962,478 B2 * | 4/2024 | Fendt | H04W 28/16 |
| 2018/0317134 A1 * | 11/2018 | Leroux | H04W 24/02 |
| 2019/0253907 A1 * | 8/2019 | Yao | H04W 24/02 |
| 2020/0154292 A1 * | 5/2020 | Bor-Yaliniz | H04L 41/40 |
| 2020/0196227 A1 * | 6/2020 | Young | G06F 9/45558 |
| 2020/0196315 A1 * | 6/2020 | Young | H04W 72/53 |
| 2021/0022024 A1 * | 1/2021 | Yao | H04W 24/08 |
| 2021/0185695 A1 * | 6/2021 | Gupta | H04W 28/16 |
| 2021/0258866 A1 * | 8/2021 | Chou | H04W 48/16 |
| 2022/0014947 A1 * | 1/2022 | Smith | H04W 24/04 |
| 2022/0045924 A1 * | 2/2022 | Yao | H04W 24/10 |
| 2022/0053354 A1 * | 2/2022 | Andrianov | H04W 24/10 |
| 2023/0025799 A1 * | 1/2023 | Goel | H04W 8/00 |
| 2023/0040563 A1 * | 2/2023 | Pinheiro | H04W 72/23 |
| 2023/0074779 A1 * | 3/2023 | Stjernholm | H04W 24/02 |
| 2023/0189006 A1 * | 6/2023 | Chou | H04W 24/02 370/328 |

* cited by examiner

*Primary Examiner* — Julio R Perez
(74) *Attorney, Agent, or Firm* — Schwegman Lundberg & Woessner, P.A.

(57) ABSTRACT

An apparatus and system of adjusting network slice subnet instance (NSSI) resources in an open-radio access network (O-RAN) are described. The non-real time RAN Intelligent Controller (Non-RT RIC) framework of a Service Management and Orchestration (SMO), receives measurements from E2 nodes of a NSSI. The measurements are forwarded to an rApp in the SMO, which uses the measurements to determine whether one or more actions are to be executed to update NSSI resources on the E2 nodes based on an NSSI optimization model. The Non-RT RIC framework sends a modify Managed Object Instance (MOI) operation to the E2 nodes to adjust the NSSI resources.

20 Claims, 10 Drawing Sheets

NETWORK SLICE SUBNET INSTANCE RESOURCE OPTIMIZATION FOR 5G SYSTEMS

PRIORITY CLAIM

This application claims the benefit of priority to U.S. Provisional Patent Application Ser. No. 63/251,491, filed Oct. 1, 2021, which is incorporated herein by reference in its entirety.

TECHNICAL FIELD

Embodiments pertain to next generation (NG) wireless networks. In particular, some embodiments relate to resource optimization for network slice subnet instances (NSSIs).

BACKGROUND

The use and complexity of NG or NR wireless systems, which include 5G networks and are starting to include sixth generation (6G) networks among others, has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated. As expected, a number of issues abound with the advent of any new technology, including complexities related to resource optimization in virtual network.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
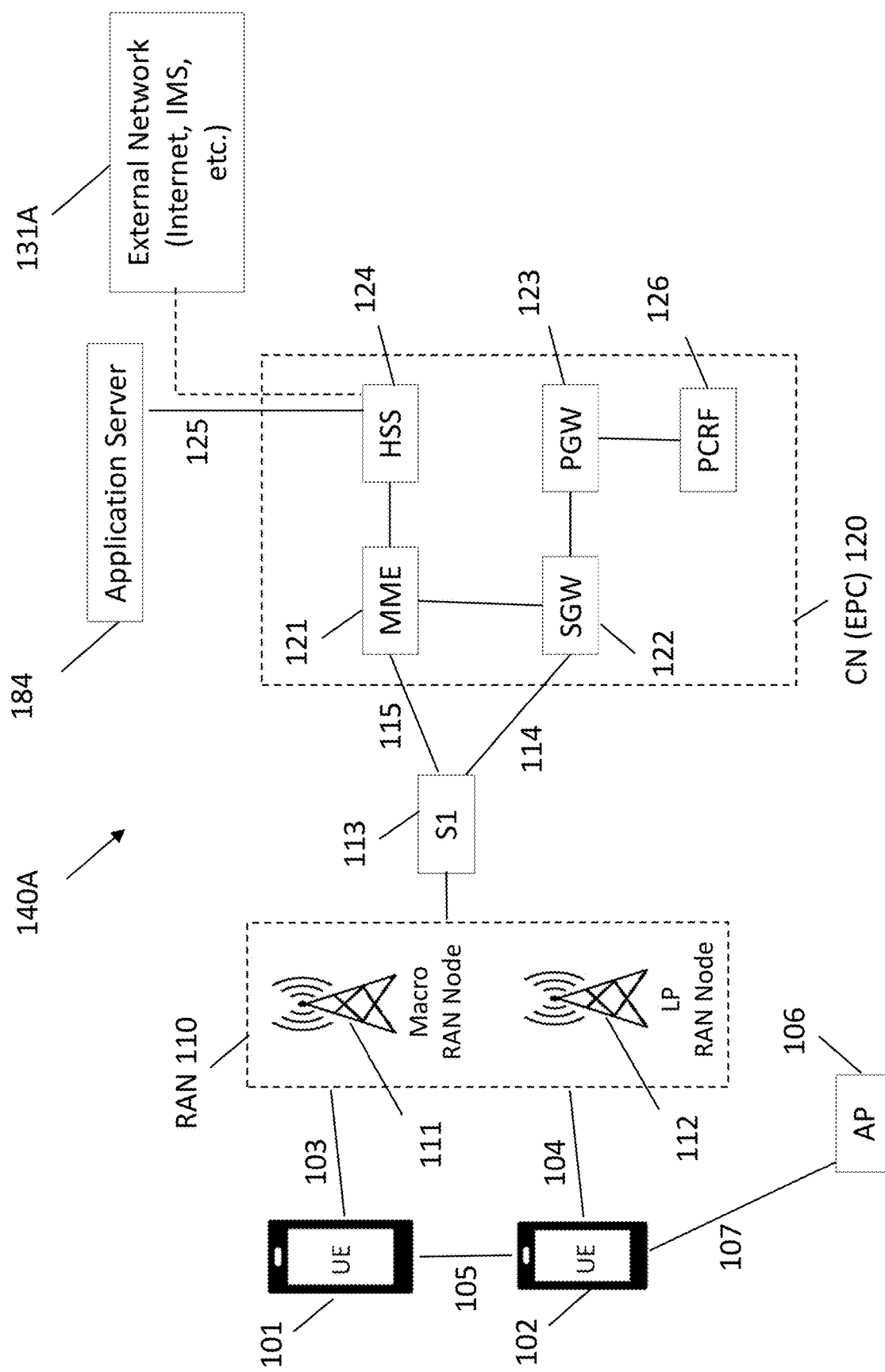
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G and later generation functions. Accordingly, although 5G will be referred to, it is to be understood that this is to extend as able to 6G (and later) structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The RAN 110 may contain one or more gNBs, one or more of which may be implemented by multiple units. Note that although gNBs may be referred to herein, the same aspects may apply to other generation NodeBs, such as $6^{th}$ generation NodeBs—and thus may be alternately referred to as Radio Access Network NodeB (xNB).

Each of the gNBs may implement protocol entities in the 3GPP protocol stack, in which the layers are considered to be ordered, from lowest to highest, in the order Physical (PHY), Medium Access Control (MAC), Radio Link Control (RLC), Packet Data Convergence Control (PDCP), and Radio Resource Control (RRC)/Service Data Adaptation Protocol (SDAP) (for the control plane/user plane). The protocol layers in each gNB may be distributed in different units—a Central Unit (CU), at least one Distributed Unit (DU), and a Remote Radio Head (RRH). The CU may provide functionalities such as the control the transfer of user data, and effect mobility control, radio access network sharing, positioning, and session management, except those functions allocated exclusively to the DU.

The higher protocol layers (PDCP and RRC for the control plane/PDCP and SDAP for the user plane) may be implemented in the CU, and the RLC and MAC layers may be implemented in the DU. The PHY layer may be split, with the higher PHY layer also implemented in the DU, while the lower PHY layer is implemented in the RRH. The CU, DU and RRH may be implemented by different manufacturers, but may nevertheless be connected by the appropriate interfaces therebetween. The CU may be connected with multiple DUs.

The interfaces within the gNB include the E1 and fronthaul (F) F1 interface. The E1 interface may be between a CU control plane (gNB-CU-CP) and the CU user plane (gNB-CU-UP) and thus may support the exchange of signaling information between the control plane and the user plane through E1AP service. The E1 interface may separate Radio Network Layer and Transport Network Layer and enable exchange of UE associated information and non-UE associated information. The E1AP services may be non UE-associated services that are related to the entire E1 interface instance between the gNB-CU-CP and gNB-CU-UP using a non UE-associated signaling connection and UE-associated services that are related to a single UE and are associated with a UE-associated signaling connection that is maintained for the UE.

The F1 interface may be disposed between the CU and the DU. The CU may control the operation of the DU over the F1 interface. As the signaling in the gNB is split into control plane and user plane signaling, the F1 interface may be split into the F1-C interface for control plane signaling between the gNB-DU and the gNB-CU-CP, and the F1-U interface for user plane signaling between the gNB-DU and the gNB-CU-UP, which support control plane and user plane separation. The F1 interface may separate the Radio Network and Transport Network Layers and enable exchange of UE associated information and non-UE associated information. In addition, an F2 interface may be between the lower and upper parts of the NR PHY layer. The F2 interface may also be separated into F2-C and F2-U interfaces based on control plane and user plane functionalities.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core to network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a core network (CN) 120. The NG-RAN 110 can include a plurality of nodes, such as gNBs and NG-eNBs. The CN 120 (e.g., a 5G core network (5GC)) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
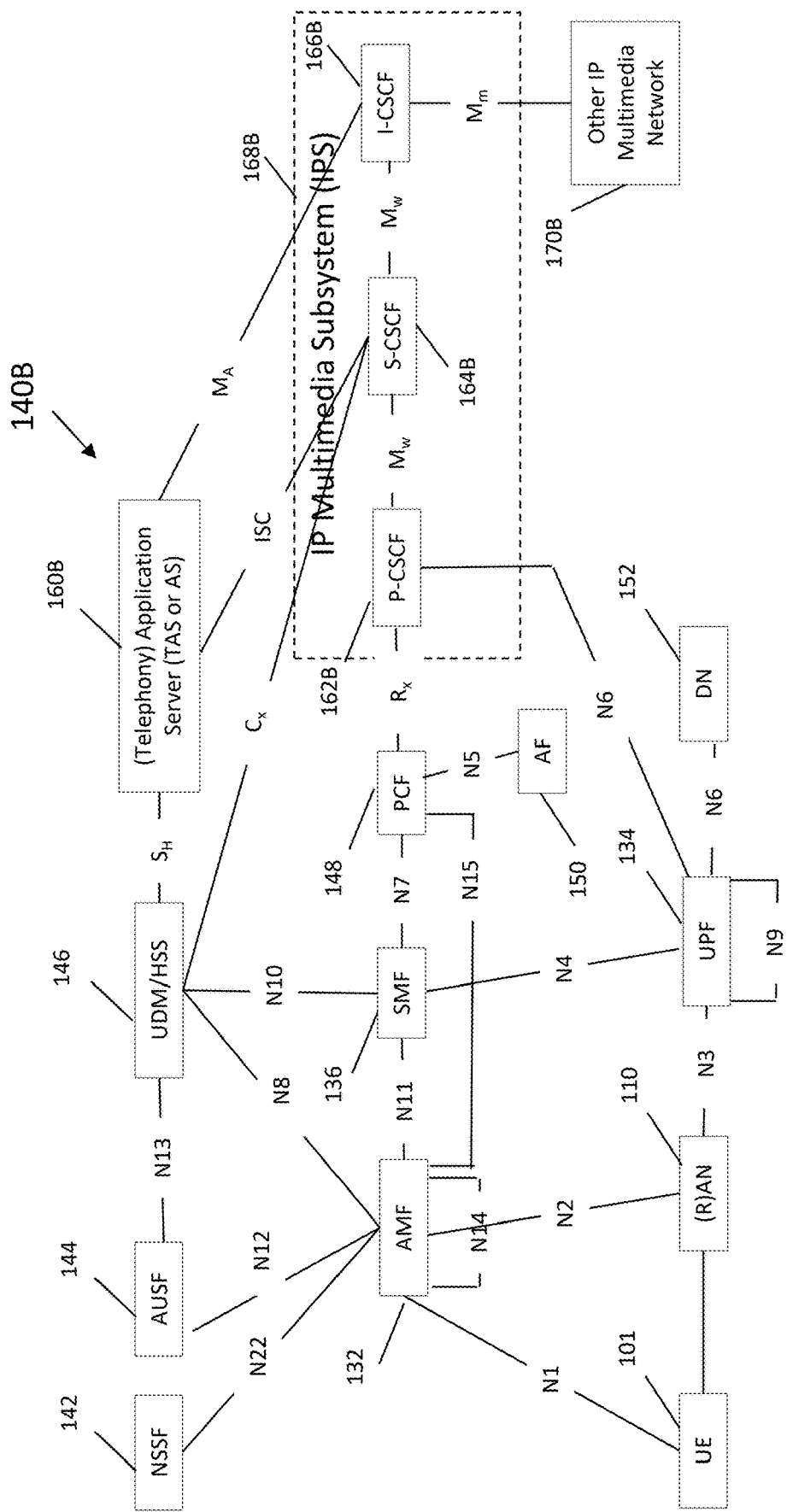
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 can be in communication with RAN 110 as well as one or more other CN network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170B, e.g. an IMS operated by a different network operator.

In some aspects, the UDM/HSS 146 can be coupled to an application server (AS) 160B, which can include a telephony application server (TAS) or another application server. The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
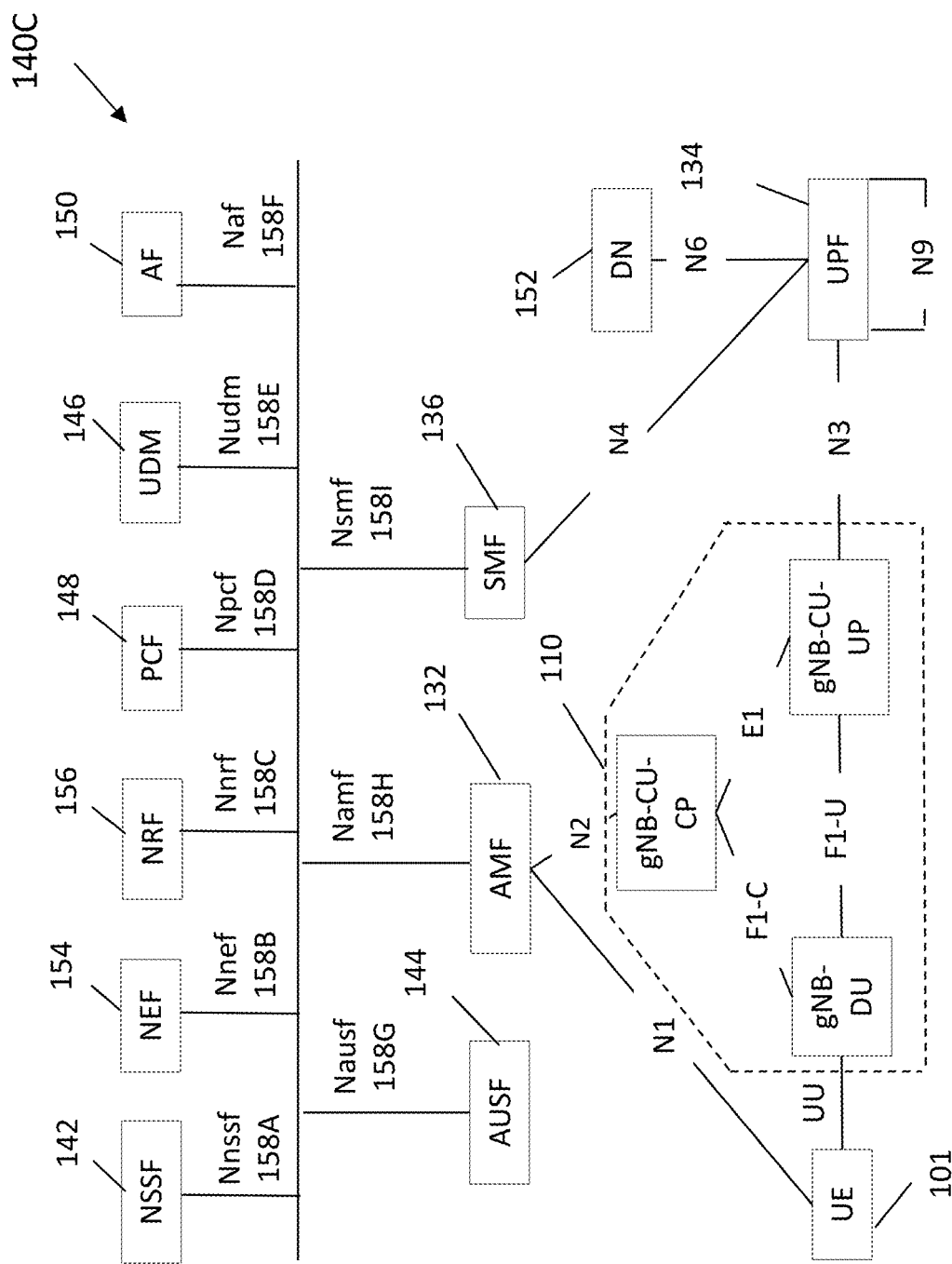
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
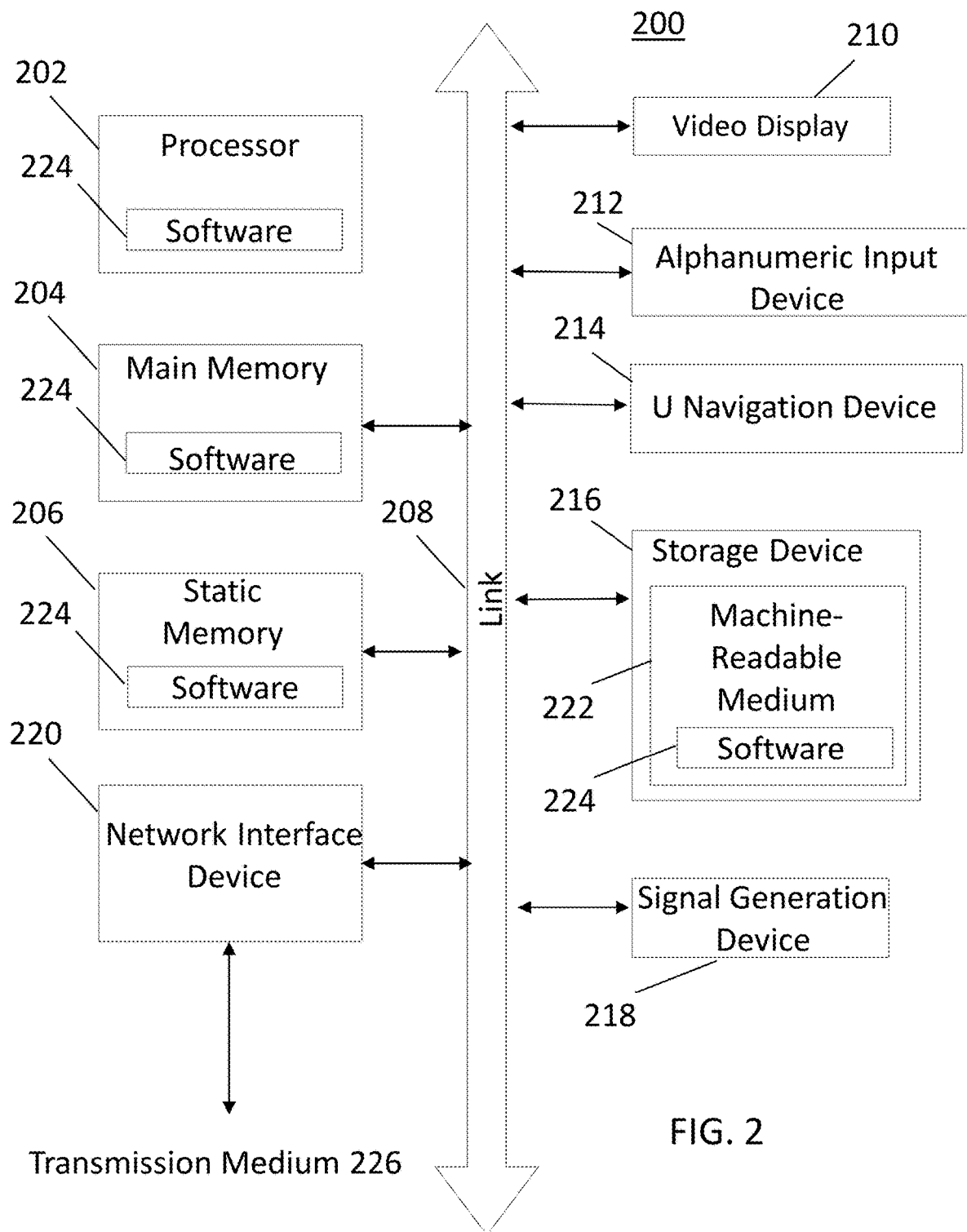
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may to further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/$5^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., lowithmedium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

5G networks extend beyond the traditional mobile broadband services to provide various new services such as internet of things (IoT), industrial control, autonomous driving, mission critical communications, etc. that may have ultra-low latency, ultra-high reliability, and high data capacity requirements due to safety and performance concerns. Some of the features in this document are defined for the network side, such as APs, eNBs, NR or gNBs—note that this term is typically used in the context of 3GPP 5G and 6G communication systems, etc. Still, a UE may take this role as well and act as an AP, eNB, or gNB; that is some or all features defined for network equipment may be implemented by a UE.

As above, network slicing is integral to 5G, as it enables new services across manufacturing, autonomous driving, gaming, and many more via the provision of ultra-low latency in URLLC and huge data volume in eMBB features that use different or contrasting QoS requirements exploiting a shared RAN node. Therefore, it is a challenging task for 5G networks to allocate resources dynamically and efficiently among multiple network slice instances.

As the new 5G services have different characteristics, the network traffic tends to be sporadic, where there may be different usage pattern in terms of time, location, UE distribution, and types of applications. For example, most IoT sensor applications may run during off-peak hours or weekends. Special events, such as sport games, concerts, can cause traffic demand to shoot up at certain time and locations. Cars with autonomous driving capability tend to require more Ultra-Reliable and Low Latency (URLLC) services in the morning or afternoon rush hours in major freeways in big cities, while subscribers tend to consume enhanced mobile broadband (eMBB) services to watch video streaming at night in residential areas. Therefore, NSSI resource optimization function that is realized as an rAPP in a non real time RAN Intelligent Controller (Non-RT RIC) that trains the artificial intelligence (AI)/machine learning (ML) model, based on the huge volume of performance data collected over days, weeks, months from O-RAN nodes. It then uses the AI/ML model to predict the traffic demand patterns of 5G networks in different times and locations for each network slice, and automatically optimize the resource allocation for network slice instances accordingly to improve user experiences and maintain optimal network usage efficiency. rAPP is a Non-RT RIC application designed to consume and/or produce R1 services, which are collection of services including, but not limited to, service registration and discovery services, authentication and authorization services, AI/ML workflow services, and A1, O1 and O2 interface related services.

Among other things, embodiments herein are directed to the optimization of NSSI resources based on the AI/ML training and inference. Embodiments may be directed to Load Balancing Optimization (LBO) and Mobility Robustness Optimization (MRO).

3.6 Use Case 6: NSSI Resource Optimization

This use case provides the background, objectives, solution, and requirements for the NSSI resource optimization, a rAPP implemented in Non-RT RIC, which leverages AI/ML inference on slice performance measurement data to determine the actions to automatically optimize the resource allocation for network slice instances.

3.6.1 Background and Goal of the Use Case

Network slicing is integral to 5G, as it enables many new services across manufacturing, autonomous driving, gaming, and many more via the provision of ultra-low latency in URLLC and huge data volume in eMBB features that require different or contrasting QoS requirements exploiting a shared RAN node. The goal of this use case is to ensure the resources are allocated dynamically and efficiently among multiple NSSI sharing the RAN node.

As the new 5G services have different characteristics, the network traffic tends to be sporadic, where there may be different usage pattern in terms of time, location, UE distribution, and types of applications. For example, most IoT sensor applications may run during off-peak hours or weekends. Special events, such as sport games, concerts, can cause traffic demand to shoot up at certain time and locations. Cars with autonomous driving capability tend to require more URLLC services in the morning or afternoon rush hours in major freeways in big cities, while subscribers tend to consume eMBB services to watch video streaming at night in residential areas. Therefore, NSSI resource optimization function trains to the AI/ML model, based on the huge volume of performance data collected over days, weeks, months from O-RAN nodes. It then performs inference function on the model with input measurements to predict the traffic demand patterns of 5G networks in different times and locations for each network slice, and automatically optimize the resource allocation for network slice instances accordingly.

3.6.2 Entities/Resources Involved in the Use Case

1) Non-RT RIC:
   a) Receive measurements to monitor the usage of RRM resources (e.g., PRB, RRC, DRB) identified by sNS-SAI from E2 nodes via the O1 interface
   b) Performs the model training with input measurements data received from E2 nodes to create the NSSI optimization model.
   c) Performs the inference function on the NSSI optimization model with the input measurements data to determine if any actions should be executed to update the NSSI resources on the E2 nodes.
   d) Configure the NSSI resources at the E2 node via O1 interface.
   e) Receives notifications from E2 nodes indicating the resource re-configuration was done.

2) E2 nodes (0-CU-CP, 0-CU-UP, D-DU):
   a) Support the collections and reporting of measurements that are used to monitor the resource usage on per NSSI basis via the O1 interface.

b) Support the re-configuration of attributes to update the resources allocated to each NSSI via the O1 interface.

3.6.3 Solutions 3.6.3.1 NSSI Resource Optimization

TABLE 3.6.3-1

NSSI Resource Optimization

| Use Case Stage | Evolution/Specification | <<Uses>> Related use |
|---|---|---|
| Goal | The goal is to ensure the resources (e.g., PRB, RRC, DRB) are allocated dynamically and efficiently among multiple NSSI sharing the E2 node. | |
| Actors and Roles | SMO Functions, Non-RT RIC Framework, rApp: NSSI Resource Optimization, E2 Nodes (O-CU-CP, O-CU-UP, O-DU) | |
| Assumptions | All relevant functions and components are instantiated. O1 interface connectivity is established. | |
| Pre conditions | O1 interfaces have been established to enable SMO to receive measurements from E2 nodes, and configure the E2 nodes. R1 interface has been established to enable the rApp to receive measurements form E2 nodes, and configure the E2 nodes via Non-RT RIC Framework. E2 nodes have been configured to collect the measurements, and send them to Non-RT RIC framework. The rApp performs the offline model training with input measurements data received from E2 nodes to create the NSSI optimization model. | |
| Begins when | The rApp utilizes the NSSI optimization model to perform the inference function. | |
| Step 1 (M) | Non-RT RIC Framework receives the measurements from the following E2 nodes via O1 interface, and forward the measurements to rApp via R1 interface: O-CU-CP: measurements to monitor the number of RRC connected users. O-CU-UP: measurements to monitor the number of DRB allocated, and the number of PDU sessions O-DU: measurements to monitor the number of PRBs used in the downlink and uplink data traffic. | |
| Step 2 (M) | The rApp performs the inference function on the model with input measurements data received to determine if any actions should be executed to update the NSSI resources on the E2 nodes. | |
| Step 3 (O) | If the rApp decides the RRC related resources for NSSI(s) in O-CU-CP need to be updated, then the following steps are executed: 3a: rApp requests Non-RT RIC Framework via R1 interface to update the RRC related resources for NSSI(s) in O-CU-CP. 3b: Non-RT RIC Framework uses the modify MOI (Managed Object Instance) operation to configure the MOI(s) associated with the RRC related resources at O-CU-CP via O1 interface. 3c: Non-RT RIC Framework receives a notification from O-CU-CP via O1 interface indicating the resource re-configuration was successful. 3d: Non-RT RIC Framework notifies rApp via R1 interface indicating the NSSI resources in O-CU-CP have been successfully updated. | |
| Step 4 (O) | If the rApp decides the DRB related resources for NSSI(s) in O-CU-UP need to be updated, then the following steps are executed: 4a: rApp requests Non-RT RIC Framework via R1 interface to update the DRB related resources for NSSI(s) in O-CU-UP. 4b: Non-RT RIC Framework uses the modify MOI operation to configure the MOI(s) associated with the DRB related resource at O-CU-UP via O1 interface. 4c: Non-RT RIC Framework receives a notification from O-CU-UP via O1 interface indicating the resource re-configuration was successful4d: Non-RT RIC Framework notifies rApp via R1 interface indicating the NSSI resources in O-CU-UP have been successfully updated. | |
| Step 5 (O) | If the rApp decides the PRB related resources for NSSI(s) in O-DU need to be updated, then the following steps are executed: 5a: rApp requests Non-RT RIC Framework via R1 interface to update the PRB related resources for NSSI(s) in O-DU. 5b: Non-RT RIC Framework uses the modify MOI operation to configure the MOI(s) associated with the PRB related resource at O-DU via O1 interface. 5c: Non-RT RIC Framework receives a notification from O-DU via O1 interface indicating the resource re-configuration was successful. 5d: Non-RT RIC Framework notifies rApp via R1 interface indicating the NSSI resources in O-DU have been successfully updated. | |
| Ends when | NSSI Resource Optimization has been deactivated. | |
| Exceptions | None identified | |
| Post Conditions | SLA assurance for RAN Slice(s) over a period of time is achieved | |
| Traceability | REQ-R1-FUN12, REQ-R1-FUN13 | |

```
@startuml
skinparam ParticipantPadding 5
skinparam BoxPadding 10
skinparam defaultFontSize 12
Autonumber
Box "Service Management and Orchestration" #gold
    Participant SMO as "SMO Functions"
    Participant NON as "Non-RT RIC Framework"
    Participant RAPP as "NSSI Optimization rApp"
end box
Box "O-RAN" #lightpink
    Participant CUCP as "E2 CUCP"
    Participant CUUP as "E2 CUUP"
    Participant DU as "E2 DU"
```

```
End box
RAPP-> RAPP : Perform offline model training with \ninput measurement data
from E2 nodes \nto create the NSSI optimization model.
group Loop: NSSI resource optimization loop
    CUCP->NON : <<O1>> PM data to monitor the usage of RRC related
resources
    NON-> RAPP : <<R1>> input measurement \ndata for RRC related
resources
    CUUP->NON : <<O1>> PM data to monitor the usage of DRB related
resources
    NON-> RAPP : <<R1>> input measurement \ndata for DRB related
resources
    DU->NON : <<O1>> PM data to monitor the usage of PRB related
resources
    NON-> RAPP : <<R1>> input measurement \ndata for PRB related
resources
    RAPP-> RAPP : Performs inference based on NSSI \noptimization
model with input \nmeasurement data from E2 nodes \nto decide the actions to
update the \nNSSI resources in E2 nodes if needed
     group Opt: RRC resources for NSSI(s) in O-CU-CP need to be updated
        RAPP-> NON : <<R1>> Request to update \nthe RRC related
resources for \nNSSI(s)
        NON-> CUCP : <<O1>> Configure the MOI associated with the
RRC related resources
        CUCP-> NON : <<O1>> Notify the resource re-configuration
was successful
        NON-> RAPP : <<R1>> Notify the NSSI \nresources have been
updated
     end
     group Opt: DRB resources for NSSI(s) in O-CU-UP need to be updated
        RAPP-> NON : <<R1>> Request to update \nthe DRB related
resources for \nNSSI(s)
        NON-> CUUP : <<O1>> Configure the MOI associated with the
DRB related resources
        CUUP-> NON : <<O1>> Notify the resource re-configuration
was successful
        NON-> RAPP : <<R1>> Notify the NSSI \nresources have been
updated
     end
     group Opt: PRB resources for NSSI(s) in O-DU need to be updated
        RAPP-> NON : <<R1>> Request to update \nthe PRB related
resources for \nNSSI(s)
        NON-> DU : <<O1>> Configure the MOI associated with the
PRB related resources
        DU-> NON : <<O1>> Notify the resource re-configuration was
successful
        NON-> RAPP : <<R1>> Notify the NSSI \nresources have been
updated
     end
end
@enduml
```

Figure 3:
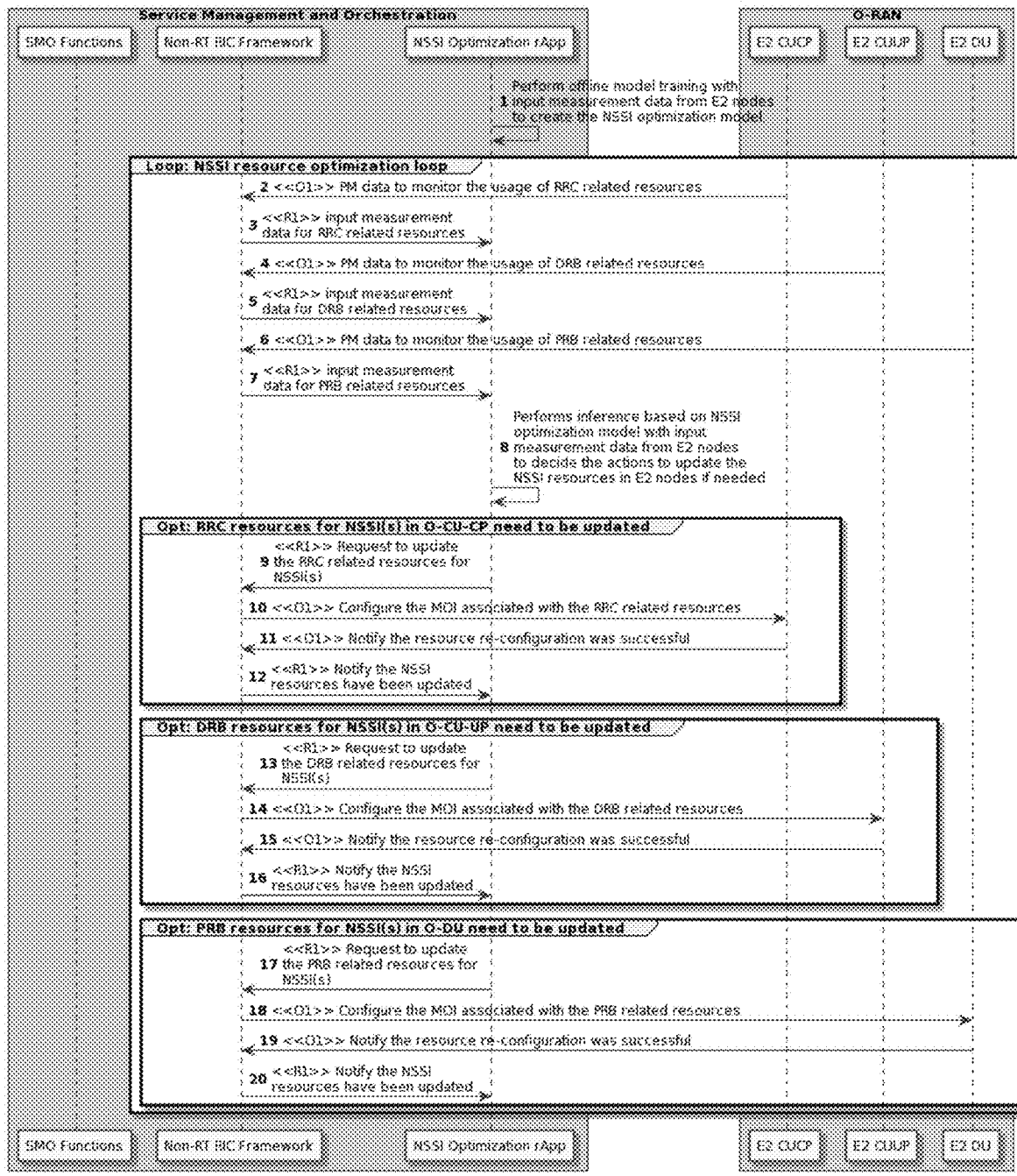
FIG. 3 illustrates an NSSI resource optimization flow in accordance with some embodiments.

FIG. 3 illustrates an NSSI resource optimization flow in accordance with some embodiments.

3.6.4 Required Data

This subclause contains the input and output data of model training and inference.

3.6.4.1 Input Data

The measurement input data are used in model training and inference. They include the following measurements to monitor the resource usage for NSSI(s) in network functions:

1) Measurements used to monitor the usage of RRC related resources in the user plane of the central unit of the O-RAN (0-CU-CP) include:

Mean number of RRC connections—provides the mean number of RRC connections with sub-counters per single Network Slice Selection Assistance Information (sNSSAI) (see clause 5.1.1.4.1 in TS 28.552).

Peak number of RRC connections—provides the peak number of RRC connections with sub-counters per sNSSAI (see clause 5.1.1.4.2 in TS 28.552).

2) Measurements used to monitor the usage of data radio bearer (DRB)-related resources in the 0-CU-UP include:

Mean number of DRBs being allocated—provides the mean number of DRBs being allocated in the PDU sessions with sub-counters per sNSSAI (see clause 5.1.1.10.10 in TS 28.552).

Peak number of DRBs being allocated—provides the peak number of DRBs being allocated in the PDU sessions with sub-counters per sNSSAI (see clause 5.1.1.10.9 in TS 28.552).

3) Measurements used to monitor the usage of physical resource block (PRB)-related resources in the O-DU include:

Mean DL PRB used for data traffic—provides the mean number of PRBs used in downlink for data traffic with sub-counters per sNSSAI (see clause 5.1.1.2.5 in TS 28.552).

Peak DL PRB used for data traffic—provides the peak number of PRBs used in downlink for data traffic with sub-counters per sNSSAI (see clause 5.1.1.2.9 in TS 28.552).

Mean UL PRB used for data traffic—provides the mean number of PRBs used in uplink for data traffic with sub-counters per sNSSAI (see clause 5.1.1.2.7 in TS 28.552).

Peak UL PRB used for data traffic—provides the peak number of PRBs used in uplink for data traffic with sub-counters per sNSSAI (see clause 5.1.1.2.10 in TS 28.552).

Mean number of packet data unit (PDU) Sessions being allocated—provides the mean number of PDU Sessions being allocated with sub-counters per sNSSAI (see clause 5.1.1.5.4 in TS 28.552).

Peak number of PDU Sessions being allocated—provides the peak number of PDU Sessions being allocated with sub-counters per sNSSAI (see clause 5.1.1.5.5 in TS 28.552).

Mean number of Active UEs in the DL per cell—provides the mean number of active UEs in downlink with sub-counters per sNSSAI (see clause 5.1.1.23.1 in TS 28.552).

Maximum number of Active UEs in the DL per cell—provides the maximum number of active UEs in downlink with sub-counters per sNSSAI (see clause 5.1.1.23.2 in TS 28.552).

Mean number of Active UEs in the UL per cell—provides the mean number of active UEs in uplink with sub-counters per sNSSAI (see clause 5.1.1.23.3 in TS 28.552).

Maximum number of Active UEs in the UL per cell—provides the maximum number of active UEs in uplink with sub-counters per sNSSAI (see clause 5.1.1.23.4 in TS 28.552).

3.6.4.2 Output Data

The output data as defined in RRMPolicyRatio IOC with RRMPolicy abstract class (TS 28.541) enable NSSI resource optimization function to re-configure the NSSI resources in network functions via O1 interface, where:

RRMPolicy information object class (IOC):

resourceType—the resources (e.g., PRB for 0-DU, RRC connected users for 0-CU-CP, and DRB for 0-CU-UP) to which the RRMPolicy is applicable.

rRMPolicyMemberList—the list of NSSI(s) to which the RRMPolicy is applicable.

RRMPolicyRatio IOC with rRMPolicyMaxRatio, rRMPolicyMinRatio, and rRMPolicyDedicatedRatio attributes to calculate dedicated resources, prioritized resources, and shared resources.

3.6.5 O1 Usage Example

Figure 4:
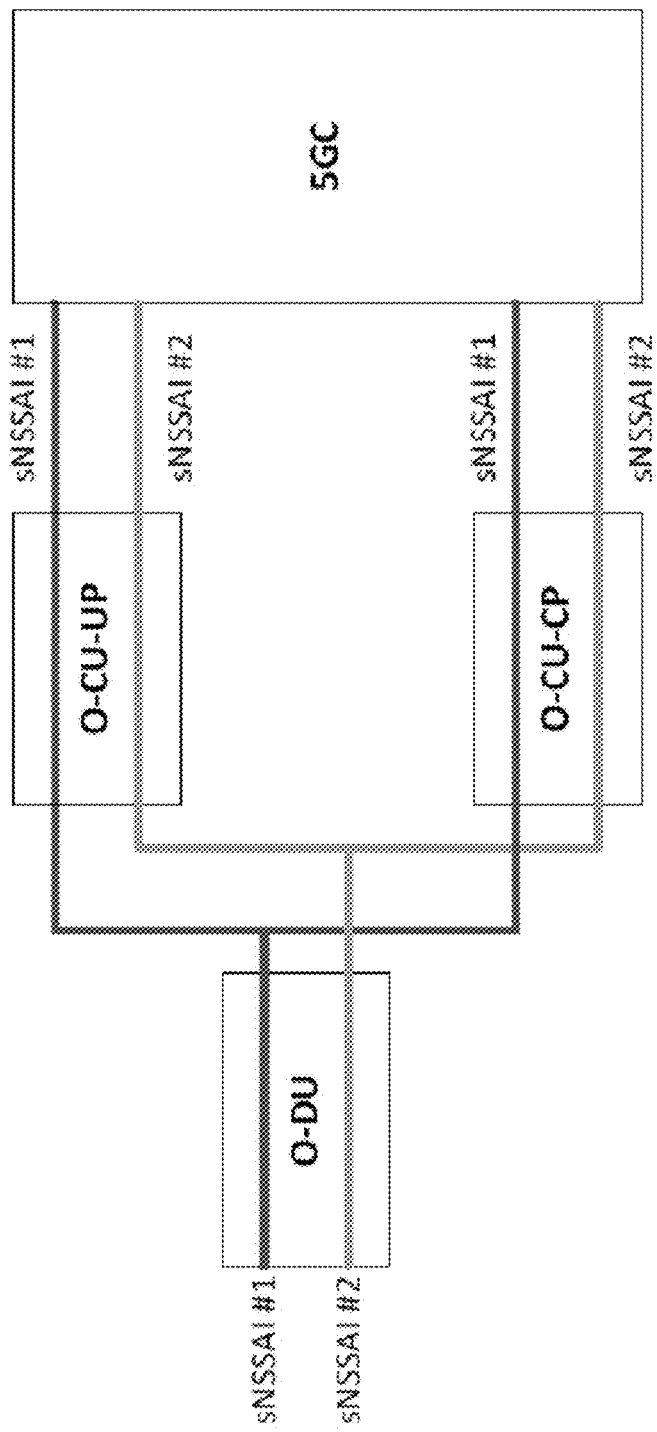
FIG. 4 illustrates an NSSI resource optimization example in accordance with some embodiments.

FIG. 4 illustrates an NSSI resource optimization example in accordance with some embodiments. FIG. 4 depicts an example of NSSI resources optimization with 2 NSSIs, where sNSSAI #1 supporting URLLC, and sNSSAI #2 supporting eMBB.

Figure 5:
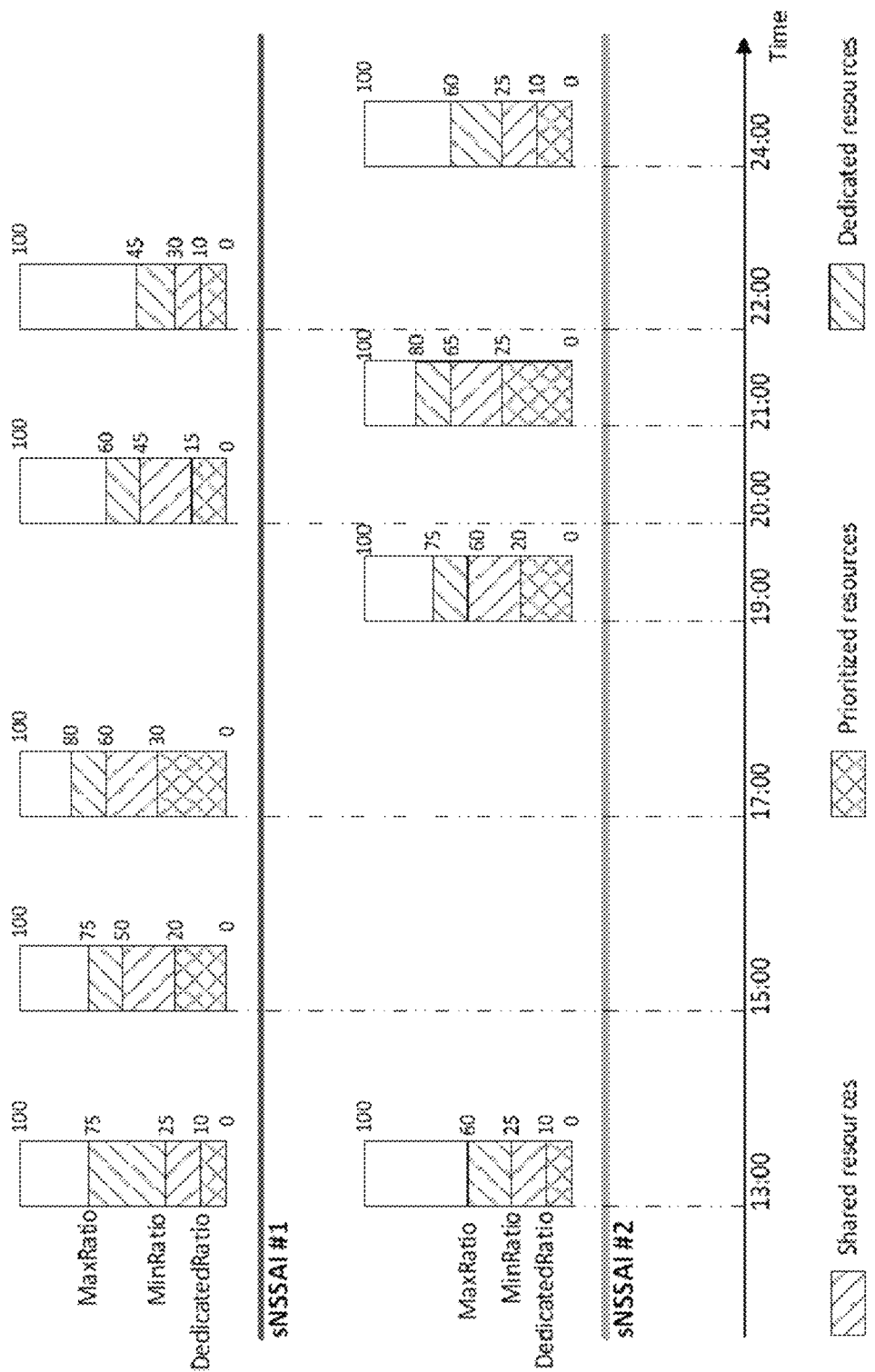
FIG. 5 illustrates an NSSI resource allocations for an Open RAN (O-RAN) distributed unit (O-DU) in accordance with some embodiments.

The NSSI resources optimization function runs model inference with input measurement data collected from the networks functions for sNSSAI #1 and sNSSAI #2, and detects a traffic pattern for the O-DU serving an area with high density of business and residential users at the time on a given day. FIG. 5 illustrates an NSSI resource allocations for an O-RAN O-DU in accordance with some embodiments. In particular, FIG. 5 shows an example of PRB resource allocation for sNSSAI #1 and sNSSAI #2 at the O-DU.

At 15:00, the dedicated resources and prioritized resources for sNSSAI #1 were increased to 20% and 50% respectively as more cars demand more URLLC services at the start of rush hour.

At 17:00, the dedicated resources, prioritized resources, and shaded resources for sNSSAI #1 were further increased as the rush hour traffic gets worse.

At 19:00, the dedicated resources, prioritized resources, and shared resources for sNSSAI #2 were increased to 20%, 60%, and 75% respectively as more residential users demand more eMBB services for home video streaming.

At 20:00, the dedicated resources, prioritized resources, and shared resources for sNSSAI #1 were decreased as the rush hour traffic comes to an end.

At 21:00, the dedicated resources, prioritized resources, and shared resources for sNSSAI #2 were further increased as the demand for eMBB services increase.

At 22:00, the dedicated resources, prioritized resources, and shared resources for sNSSAI #1 were decreased as the demand for URLLC services further reduce.

At 24:00, the dedicated resources, prioritized resources, and shred resources for sNSSAI #2 were decreased to 10%, 25%, and 60% respectively as the demand for eMBB services further reduce.

Figure 6:
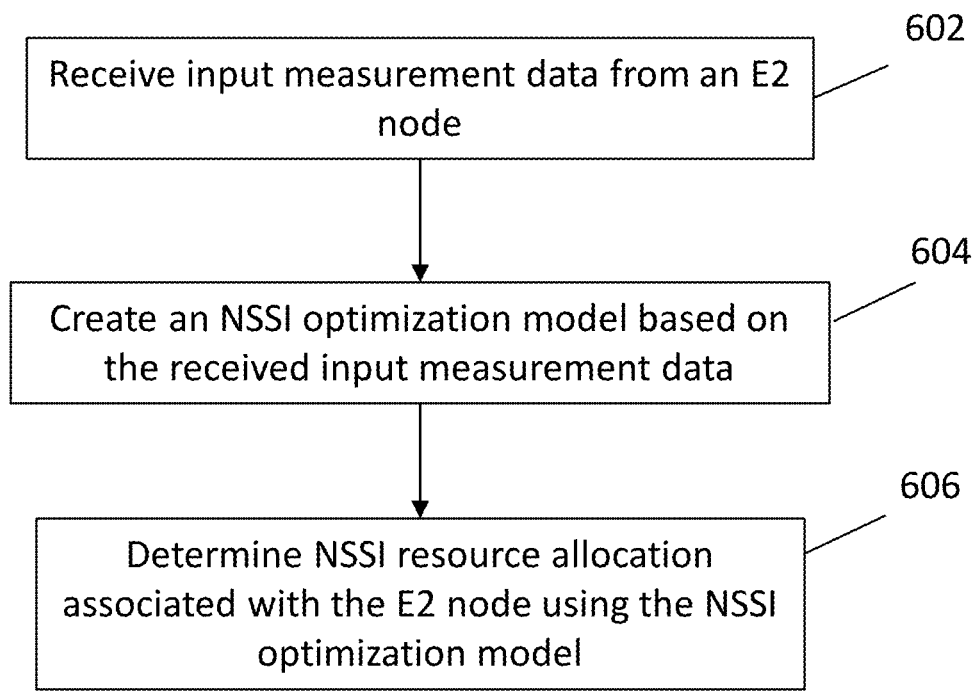
FIG. 6 illustrates a method of providing an NSSI resource allocation in accordance with some embodiments.

Chapter 4 Requirements 4.1 Functional Requirements 4.1.3 R1 Interface Functional Requirements FIG. 6 illustrates a method of providing an NSSI resource allocation in accordance with some embodiments. Only some of the operations are shown for convenience. Other operations may be present. Some of the operations may be combined. The operations in FIG. 6 may be performed by a NSSI optimization rApp in some embodiments. At operation 602 of the method 600, input measurement data may be received from an E2 node. At operation 604, an NSSI optimization model may be created based on the received input measurement data. At operation 606, an NSSI resource allocation associated with the E2 node may be determined by performing the inference function of the NSSI optimization model.

Figure 7:
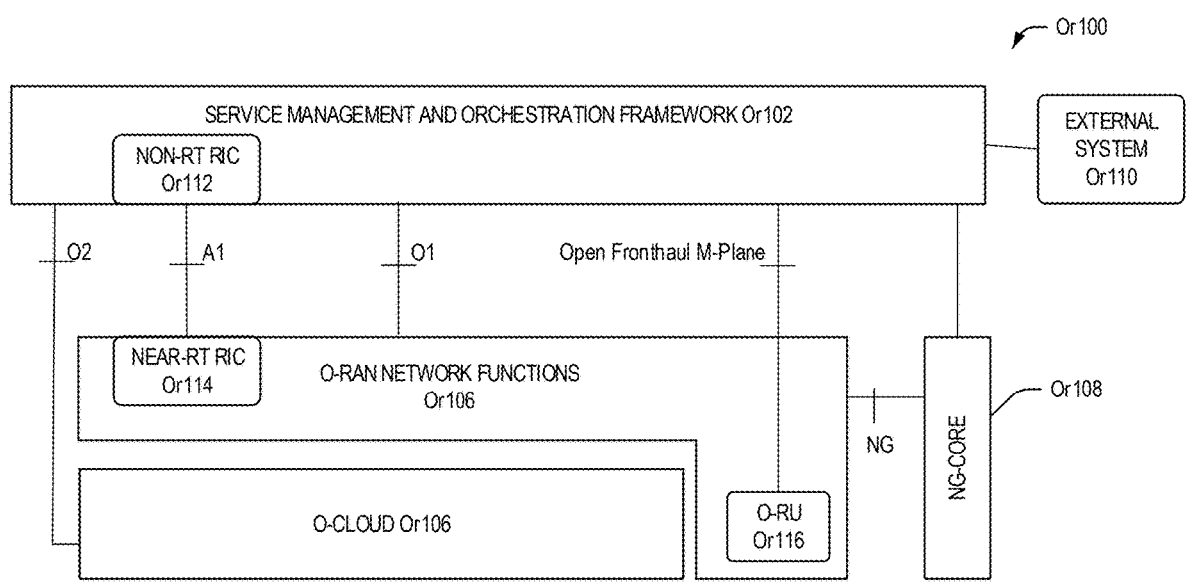
FIG. 7 illustrates an O-RAN architecture in accordance with some embodiments.

FIG. 7 illustrates an O-RAN architecture in accordance with some embodiments. In FIG. 7, the O-RAN architecture Or100 includes four O-RAN defined interfaces—namely, the A1 interface, the O1 interface, the O2 interface, and the Open Fronthaul Management (M)-plane interface—which connect the Service Management and Orchestration (SMO) framework Or102 to O-RAN network functions (NFs) Or104 and the O-Cloud Or106. The SMO Or102 also connects with an external system Or110, which provides data to the SMO Or102. FIG. 7 also illustrates that the A1 interface terminates at an O-RAN Non-Real Time (RT) RAN Intelligent Controller (RIC) Or112 in or at the SMO Or102 and at the O-RAN Near-RT RIC Or114 in or at the O-RAN NFs Or104. The O-RAN NFs Or104 can be VNFs such as VMs or containers, sitting above the O-Cloud Or106 and/or Physical Network Functions (PNFs) utilizing customized hardware. All O-RAN NFs Or104 are expected to support the O1 interface when interfacing the SMO framework Or102. The O-RAN NFs Or104 connect to the NG-Core Or108 via the NG interface (which is a 3GPP defined interface). The Open Fronthaul M-plane interface between the SMO Or102 and the O-RAN Radio Unit (O-RU) Or116 supports the O-RU Or116 management in to the O-RAN hybrid model. The Open Fronthaul M-plane interface is an optional interface to the SMO Or102 that is included for backward compatibility purposes, and is intended for management of the O-RU Or116 in hybrid mode only. The management architecture of flat mode and its relation to the O1 interface for the O-RU Or116 is for future study. The O-RU Or116 termination of the O1 interface towards the SMO Or102.

Figure 8:
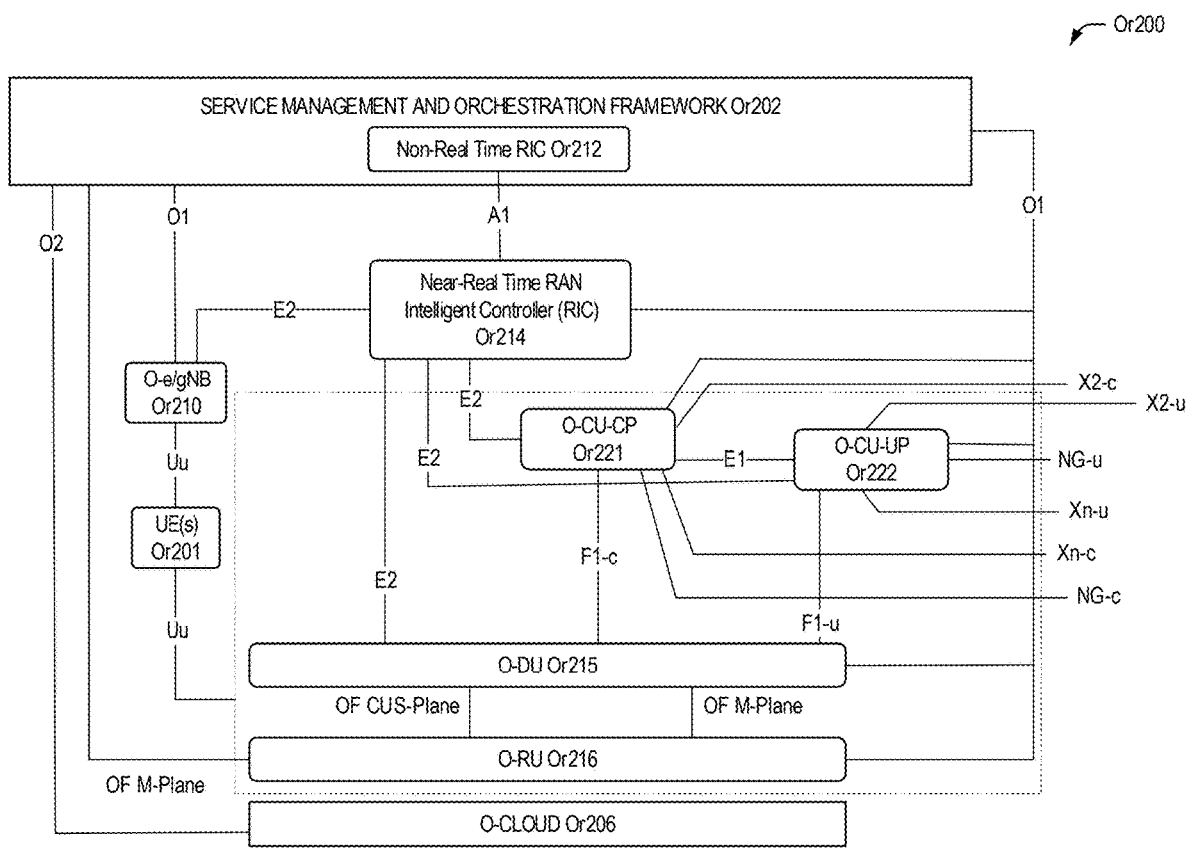
FIG. 8 illustrates the Uu interface between components in the O-RAN architecture in accordance with some embodiments.

FIG. 8 illustrates the Uu interface between components in the O-RAN architecture in accordance with some embodiments. FIG. 8 shows an O-RAN logical architecture Or200 corresponding to the O-RAN architecture Or100 of FIG. Or1. In FIG. 8, the SMO Or202 corresponds to the SMO Or102, O-Cloud Or206 corresponds to the O-Cloud Or106, the non-RT RIC Or212 corresponds to the non-RT RIC Or112, the near-RT RIC Or214 corresponds to the near-RT RIC Or114, and the O-RU Or216 corresponds to the O-RU Or116 of FIG. 8, respectively. The O-RAN logical architecture Or200 includes a radio portion and a management portion.

The management portion/side of the architectures Or200 includes the SMO Framework Or202 containing the non-RT RIC Or212, and may include the O-Cloud Or206. The O-Cloud Or206 is a cloud computing platform including a collection of physical infrastructure nodes to host the relevant O-RAN functions (e.g., the near-RT RIC Or214, O-CU-CP Or221, O-CU-UP Or222, and the O-DU Or215), supporting software components (e.g., OSs, VMMs, container runtime engines, ML engines, etc.), and appropriate management and orchestration functions.

The radio portion/side of the logical architecture Or200 includes the near-RT RIC Or214, the O-RAN Distributed Unit (O-DU) Or215, the O-RU Or216, the O-RAN Central Unit—Control Plane (O-CU-CP) Or221, and the O-RAN Central Unit—User Plane (O-CU-UP) Or222 functions. The radio portion/side of the logical architecture Or200 may also include the O-e/gNB Or210.

The O-DU Or215 is a logical node hosting RLC, MAC, and higher PHY layer entities/elements (High-PHY layers) based on a lower layer functional split. The O-RU Or216 is a logical node hosting lower PHY layer entities/elements (Low-PHY layer) (e.g., FFT/iFFT, PRACH extraction, etc.) and RF processing elements based on a lower layer functional split. Virtualization of O-RU Or216 is FFS. The O-CU-CP Or221 is a logical node hosting the RRC and the control plane (CP) part of the PDCP protocol. The O O-CU-UP Or222 is a logical node hosting the user plane part of the PDCP protocol and the SDAP protocol.

An E2 interface terminates at a plurality of E2 nodes. The E2 nodes are logical nodes/entities that terminate the E2 interface. For NR/5G access, the E2 nodes include the O-CU-CP Or221, O-CU-UP Or222, O-DU Or215, or any combination of elements. For E-UTRA access the E2 nodes include the O-e/gNB Or210. As shown in FIG. 8, the E2 interface also connects the O-e/gNB Or210 to the Near-RT RIC Or214. The protocols over E2 interface are based exclusively on Control Plane (CP) protocols. The E2 functions are grouped into the following categories: (a) near-RT RIC Or214 services (REPORT, INSERT, CONTROL and POLICY); and (b) near-RT RIC Or214 support functions, which include E2 Interface Management (E2 Setup, E2 Reset, Reporting of General Error Situations, etc.) and Near-RT RIC Service Update (e.g., capability exchange related to the list of E2 Node functions exposed over E2).

FIG. 8 shows the Uu interface between a UE Or201 and O-e/gNB Or210 as well as between the UE Or201 and O-RAN components. The Uu interface is a 3GPP defined interface (see e.g., sections 5.2 and 5.3 of TS 38.401), which includes a complete protocol stack from L1 to L3 and terminates in the NG-RAN or E-UTRAN. The O-e/gNB Or210 is an LTE eNB, a 5G gNB or ng-eNB that supports the E2 interface. There may be multiple UEs Or201 and/or multiple O-e/gNB Or210, each of which may be connected to one another the via respective Uu interfaces. Although not shown in FIG. 8, the O-e/gNB Or210 supports O-DU Or215 and O-RU Or216 functions with an Open Fronthaul interface between them.

The Open Fronthaul (OF) interface(s) is/are between 0-DU Or215 and O-RU Or216 functions. The OF interface(s) includes the Control User Synchronization (CUS) Plane and Management (M) Plane. FIGS. Or1 and Or2 also show that the O-RU Or216 terminates the OF M-Plane interface towards the O-DU Or215 and optionally towards the SMO Or202. The O-RU Or216 terminates the OF CUS-Plane interface towards the O-DU Or215 and the SMO Or202.

The F1-c interface connects the O-CU-CP Or221 with the O-DU Or215. As defined by 3GPP, the F1-c interface is between the gNB-CU-CP and gNB-DU nodes. However, for purposes of O-RAN, the F1-c interface is adopted between the O-CU-CP Or221 with the O-DU Or215 functions while reusing the principles and protocol stack defined by 3GPP and the definition of interoperability profile specifications.

The F1-u interface connects the O-CU-UP Or222 with the O-DU Or215. As defined by 3GPP, the F1-u interface is between the gNB-CU-UP and gNB-DU nodes. However, for purposes of O-RAN, the F1-u interface is adopted between the O-CU-UP Or222 with the O-DU Or215 functions while reusing the principles and protocol stack defined by 3GPP and the definition of interoperability profile specifications.

The NG-c interface is defined by 3GPP as an interface between the gNB-CU-CP and the AMF in the 5GC. The NG-c is also referred as the N2 interface (see TS 38.300). The NG-u interface is defined by 3GPP, as an interface between the gNB-CU-UP and the UPF in the 5GC. The NG-u interface is referred as the N3 interface (see TS 38.300). In O-RAN, NG-c and NG-u protocol stacks defined by 3GPP are reused and may be adapted for O-RAN purposes.

The X2-c interface is defined in 3GPP for transmitting control plane information between eNBs or between eNB and en-gNB in EN-DC. The X2-u interface is defined in 3GPP for transmitting user plane information between eNBs or between eNB and en-gNB in EN-DC (see e.g., TS 36.420 and TS 38.300). In O-RAN, X2-c and X2-u protocol stacks defined by 3GPP are reused and may be adapted for O-RAN purposes.

The Xn-c interface is defined in 3GPP for transmitting control plane information between gNBs, ng-eNBs, or between an ng-eNB and gNB. The Xn-u interface is defined in 3GPP for transmitting user plane information between gNBs, ng-eNBs, or between ng-eNB and gNB (see e.g., TS 38.420 and TS 38.300). In O-RAN, Xn-c and Xn-u protocol stacks defined by 3GPP are reused and may be adapted for O-RAN purposes.

The E1 interface is defined by 3GPP as being an interface between the gNB-CU-CP (e.g., gNB-CU-CP 3728) and gNB-CU-UP (see e.g., TS 38.401 and TS 38.460). In O-RAN, E1 protocol stacks defined by 3GPP are reused and adapted as being an interface between the O-CU-CP Or221 and the O-CU-UP Or222 functions.

The O-RAN Non-Real Time (RT) RAN Intelligent Controller (RIC) Or212 is a logical function within the SMO framework Or102, Or202 that enables non-real-time control and optimization of RAN elements and resources; AI/machine learning (ML) workflow(s) including model training, inferences, and updates; and policy-based guidance of applications/features in the Near-RT RIC Or214.

The O-RAN near-RT RIC Or214 is a logical function that enables near-real-time control and optimization of RAN elements and resources via fine-grained data collection and actions over the E2 interface. The near-RT RIC Or214 may include one or more AI/ML workflows including model training, inferences, and updates.

The non-RT RIC Or212 can be an ML training host to host the training of one or more ML models. ML training can be performed offline using data collected from the RIC, O-DU Or215 and O-RU Or216. For supervised learning, non-RT RIC Or212 is part of the SMO Or202, and the ML training host and/or ML model host/actor can be part of the non-RT RIC Or212 and/or the near-RT RIC Or214. For unsupervised learning, the ML training host and ML model host/actor can be part of the non-RT RIC Or212 and/or the near-RT RIC Or214. For reinforcement learning, the ML training host and ML model host/actor may be co-located as part of the non-RT RIC Or212 and/or the near-RT RIC Or214. In some implementations, the non-RT RIC Or212 may request or trigger ML model training in the training hosts regardless of where the model is deployed and executed. ML models may be trained and not currently deployed.

In some implementations, the non-RT RIC Or212 provides a query-able catalog for an ML designer/developer to publish/install trained ML models (e.g., executable software components). In these implementations, the non-RT RIC Or212 may provide discovery mechanism if a particular ML model can be executed in a target ML inference host (MF), and what number and type of ML models can be executed in the MF. For example, there may be three types of ML catalogs made discoverable by the non-RT RIC Or212: a design-time catalog (e.g., residing outside the non-RT RIC Or212 and hosted by some other ML platform(s)), a training/deployment-time catalog (e.g., residing inside the non-RT RIC Or212), and a run-time catalog (e.g., residing inside the non-RT RIC Or212). The non-RT RIC Or212 supports necessary capabilities for ML model inference in support of ML assisted solutions running in the non-RT RIC Or212 or some other ML inference host. These capabilities enable executable software to be installed such as VMs, containers, etc. The non-RT RIC Or212 may also include and/or operate one or more ML engines, which are packaged software executable libraries that provide methods, routines, data types, etc., used to run ML models. The non-RT RIC Or212 may also implement policies to switch and activate ML model instances under different operating conditions.

The non-RT RIC Or22 is able to access feedback data (e.g., FM and PM statistics) over the O1 interface on ML model performance and perform necessary evaluations. If the ML model fails during runtime, an alarm can be generated as feedback to the non-RT RIC Or212. How well the ML model is performing in terms of prediction accuracy or other operating statistics it produces can also be sent to the non-RT RIC Or212 over O1. The non-RT RIC Or212 can also scale ML model instances running in a target MF over the O1 interface by observing resource utilization in MF. The environment where the ML model instance is running (e.g., the MF) monitors resource utilization of the running ML model. This can be done, for example, using an ORAN-SC component called ResourceMonitor in the near-RT RIC Or214 and/or in the non-RT RIC Or212, which continuously monitors resource utilization. If resources are low or fall below a certain threshold, the runtime environment in the near-RT RIC Or214 and/or the non-RT RIC Or212 provides a scaling mechanism to add more ML instances. The scaling mechanism may include a scaling factor such as a number, percentage, and/or other like data used to scale up/down the number of ML instances. ML model instances running in the target ML inference hosts may be automatically scaled by observing resource to utilization in the MF. For example, the Kubernetes® (K8s) runtime environment typically provides an auto-scaling feature.

The A1 interface is between the non-RT RIC Or212 (within or outside the SMO Or202) and the near-RT RIC Or214. The A1 interface supports three types of services, including a Policy Management Service, an Enrichment Information Service, and ML Model Management Service. A1 policies have the following characteristics compared to persistent configuration: A1 policies are not critical to traffic; A1 policies have temporary validity; A1 policies may handle individual UE or dynamically defined groups of UEs; A1 policies act within and take precedence over the configuration; and A1 policies are non-persistent, i.e., do not survive a restart of the near-RT RIC.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus comprising memory and processing circuitry, the processing circuitry to configure the apparatus to operate as a Service Management and Orchestration (SMO) to:
   receive, at a non-real time radio access network (RAN) Intelligent Controller (Non-RT RIC) framework, measurements from E2 nodes of a network slice subnet instance (NSSI) in an open-RAN (O-RAN);
   forward the measurements from the Non-RT RIC framework to an rApp;
   determine, at the rApp, whether one or more actions are to be executed to update NSSI resources on the E2 nodes based on the measurements and an NSSI optimization model; and
   update the NSSI resources at at least one of the E2 nodes in response to a determination that the one or more actions are to be executed,
   wherein the memory is configured to store the measurements.

2. The apparatus of claim 1, wherein the E2 nodes include at least one of an O-RAN Distributed Unit (O-DU), an O-RAN Central Unit—Control Plane (O-CU-CP), and an O-RAN Central Unit—User Plane (O-CU-UP).

3. The apparatus of claim 2, wherein the measurements include at least one of:
   a number of radio resource control (RRC)-connected users from the O-CU-CP,
   a number of allocated data radio bearers (DRB) and packet data unit (PDU) sessions from the O-CU-UP, and
   a number of physical resource blocks (PRBs) used in downlink and uplink data traffic from the O-DU.

4. The apparatus of claim 3, wherein to update the NSSI resources in the O-CU-CP, the processing circuitry configures the apparatus to:
   send a request from the rApp to the Non-RT RIC framework via an R1 interface to update RRC-related resources for an NSSI in the O-CU-CP,
   use, at the Non-RT RIC framework, a modify Managed Object Instance (MOI) operation to configure an MOI associated with the RRC-related resources at the O-CU-CP via an O1 interface,
   receive, at the Non-RT RIC framework, a notification from the O-CU-CP via the O1 interface indicating successful resource re-configuration, and
   notify, based on the notification, the rApp via the R1 interface that the NSSI resources in the O-CU-CP have been successfully updated.

5. The apparatus of claim 3, wherein to update the NSSI resources in the O-CU-UP, the processing circuitry configures the apparatus to:
   send a request from the rApp to the Non-RT RIC framework via an R1 interface to update DRB-related resources for an NSSI in the O-CU-UP,
   use, at the Non-RT RIC framework, a modify Managed Object Instance (MOI) operation to configure an MOI associated with the DRB-related resources at the O-CU-UP via an O1 interface,
   receive, at the Non-RT RIC framework, a notification from the O-CU-UP via the O1 interface indicating successful resource re-configuration, and
   notify, based on the notification, the rApp via the R1 interface that the NSSI resources in the O-CU-UP have been successfully updated.

6. The apparatus of claim 3, wherein to update the NSSI resources in the O-DU, the processing circuitry configures the apparatus to:
   send a request from the rApp to the Non-RT RIC framework via an R1 interface to update PRB-related resources for an NSSI in the O-DU,
   use, at the Non-RT RIC framework, a modify Managed Object Instance (MOI) operation to configure an MOI associated with the PRB-related resources at the O-DU via an O1 interface,
   receive, at the Non-RT RIC framework, a notification from the O-CU-UP via the O1 interface indicating successful resource re-configuration, and
   notify, based on the notification, the rApp via the R1 interface that the NSSI resources in the O-DU have been successfully updated.

7. The apparatus of claim 2, wherein the processing circuitry configures the apparatus to monitor radio resource control (RRC)-related resource usage in the O-CU-CP through reception of measurements that include at least one of a mean and peak number of RRC connections, each with sub-counters per single Network Slice Selection Assistance Information (sNSSAI).

8. The apparatus of claim 2, wherein the processing circuitry configures the apparatus to monitor data radio bearer (DRB)-related resource usage in the O-CU-UP through reception of measurements that include at least one of a mean and peak number of DRBs allocated in packet data unit (PDU) sessions, each with sub-counters per single Network Slice Selection Assistance Information (sNSSAI).

9. The apparatus of claim 2, wherein the processing circuitry configures the apparatus to monitor physical resource block (PRB)-related resource usage in the O-DU through reception of measurements that include at least one of:
   a mean and peak number of downlink and uplink PRBs used for data traffic,
   a mean and peak number of packet data unit (PDU) sessions allocated, and
   a mean and maximum number of active user equipment (UEs) in uplink and downlink per cell,
   each with sub-counters per single Network Slice Selection Assistance Information (sNSSAI).

10. The apparatus of claim 1, wherein the measurements are provided as a RRMPolicy information object class (IOC) with a RRMPolicy abstract class where the RRMPolicy IOC includes a resourceType attribute that indicates resources to which the RRMPolicy IOC is applicable and a rRMPolicyMemberList attribute that indicates a list of NSSIs to which the RRMPolicy IOC is applicable, and a RRMPolicyRatio IOC with a rRMPolicyMaxRatio attribute, a rRMPolicyMinRatio attribute, and a rRMPolicyDedicatedRatio attribute to calculate dedicated resources, prioritized resources, and shared resources.

11. The apparatus of claim 1, wherein the processing circuitry configures the rApp to perform offline training with input measurement data received from the E2 nodes to create the NSSI optimization model.

12. The apparatus of claim 11, wherein the NSSI optimization model is an artificial intelligence (AI)/machine learning (ML) model.

13. The apparatus of claim 1, wherein:
the processing circuitry configures the apparatus to employ the NSSI optimization model to shift resource allocations among resources of each NSSI of multiple NSSIs dependent on a type of services provided by each of the NSSIs,
the resources include dedicated resources, prioritized resources, and shared resources, and
the types of services include Ultra-Reliable and Low Latency (URLLC) services and enhanced mobile broadband (eMBB) services.

14. An apparatus comprising memory and processing circuitry, the processing circuitry to configure the apparatus to operate as an E2 node in an open-RAN (O-RAN) to:
send, to a non-real time radio access network (RAN) Intelligent Controller (Non-RT RIC) framework in a Service Management and Orchestration (SMO), performance measurement data to monitor resource usage in a network slice subnet instance (NSSI);
receive, from the Non-RT RIC framework, a modify Managed Object Instance (MOI) operation to configure an MOI associated with resources of the NSSI to adjust the resources based on the performance measurement data;
update the resources in response to the modify MOI operation; and
send, to the Non-RT RIC framework after update of the resources, a notification of successful re-configuration of the resources,
wherein the memory is configured to store the performance measurement data.

15. The apparatus of claim 14, wherein the E2 node includes at least one of an O-RAN Distributed Unit (O-DU), an O-RAN Central Unit—Control Plane (O-CU-CP), and an O-RAN Central Unit—User Plane (O-CU-UP).

16. The apparatus of claim 15, wherein the performance measurement data includes at least one of:
a number of radio resource control (RRC)-connected users from the O-CU-CP,
a number of allocated data radio bearers (DRB) and packet data unit (PDU) sessions from the O-CU-UP, and
a number of physical resource blocks (PRBs) used in downlink and uplink data traffic from the O-DU.

17. The apparatus of claim 15, wherein the performance measurement data includes at least one of:
a mean and peak number of radio resource control (RRC) connections,
a mean and peak number of data radio bearer (DRBs) allocated in packet data unit (PDU) sessions, and
a mean and peak number of downlink and uplink physical resource blocks (PRBs) used for data traffic, a mean and peak number of packet data unit (PDU) sessions allocated, and a mean and maximum number of active user equipment (UEs) in uplink and downlink per cell,
each with sub-counters per single Network Slice Selection Assistance Information (sNSSAI).

18. A non-transitory computer-readable storage medium that stores instructions for execution by one or more processors of a Service Management and Orchestration (SMO), the one or more processors to configure the SMO to, when the instructions are executed:
receive, at a non-real time radio access network (RAN) Intelligent Controller (Non-RT RIC) framework, measurements from E2 nodes of a network slice subnet instance (NSSI) in an open-RAN (O-RAN);
forward the measurements from the Non-RT RIC framework to an rApp;
determine, at the rApp, whether one or more actions are to be executed to update NSSI resources on the E2 nodes based on the measurements and an NSSI optimization model; and
update the NSSI resources at at least one of the E2 nodes in response to a determination that the one or more actions are to be executed.

19. The medium of claim 18, wherein:
the E2 nodes include at least one of an O-RAN Distributed Unit (O-DU), an O-RAN Central Unit—Control Plane (O-CU-CP), and an O-RAN Central Unit—User Plane (O-CU-UP), and
the measurements include at least one of:
a number of radio resource control (RRC)-connected users from the O-CU-CP,
a number of allocated data radio bearers (DRB) and packet data unit (PDU) sessions from the O-CU-UP, and
a number of physical resource blocks (PRBs) used in downlink and uplink data traffic from the O-DU.

20. The medium of claim 18, wherein:
the E2 nodes include at least one of an O-RAN Distributed Unit (O-DU), an O-RAN Central Unit—Control Plane (O-CU-CP), and an O-RAN Central Unit—User Plane (O-CU-UP), and
the measurements include at least one of:
a mean and peak number of radio resource control (RRC) connections,
a mean and peak number of data radio bearer (DRBs) allocated in packet data unit (PDU) sessions, and
a mean and peak number of downlink and uplink physical resource blocks (PRBs) used for data traffic,
a mean and peak number of packet data unit (PDU) sessions allocated, and a mean and maximum number of active user equipment (UEs) in uplink and downlink per cell,
each with sub-counters per single Network Slice Selection Assistance Information (sNSSAI).

* * * * *